Oct. 12, 1937.　　　　　G. TAUSCHEK　　　　　2,095,298
TELEPHONE SYSTEM
Filed Oct. 30, 1935　　　　5 Sheets—Sheet 1

INVENTOR
Gustav Tauschek
BY
ATTORNEY

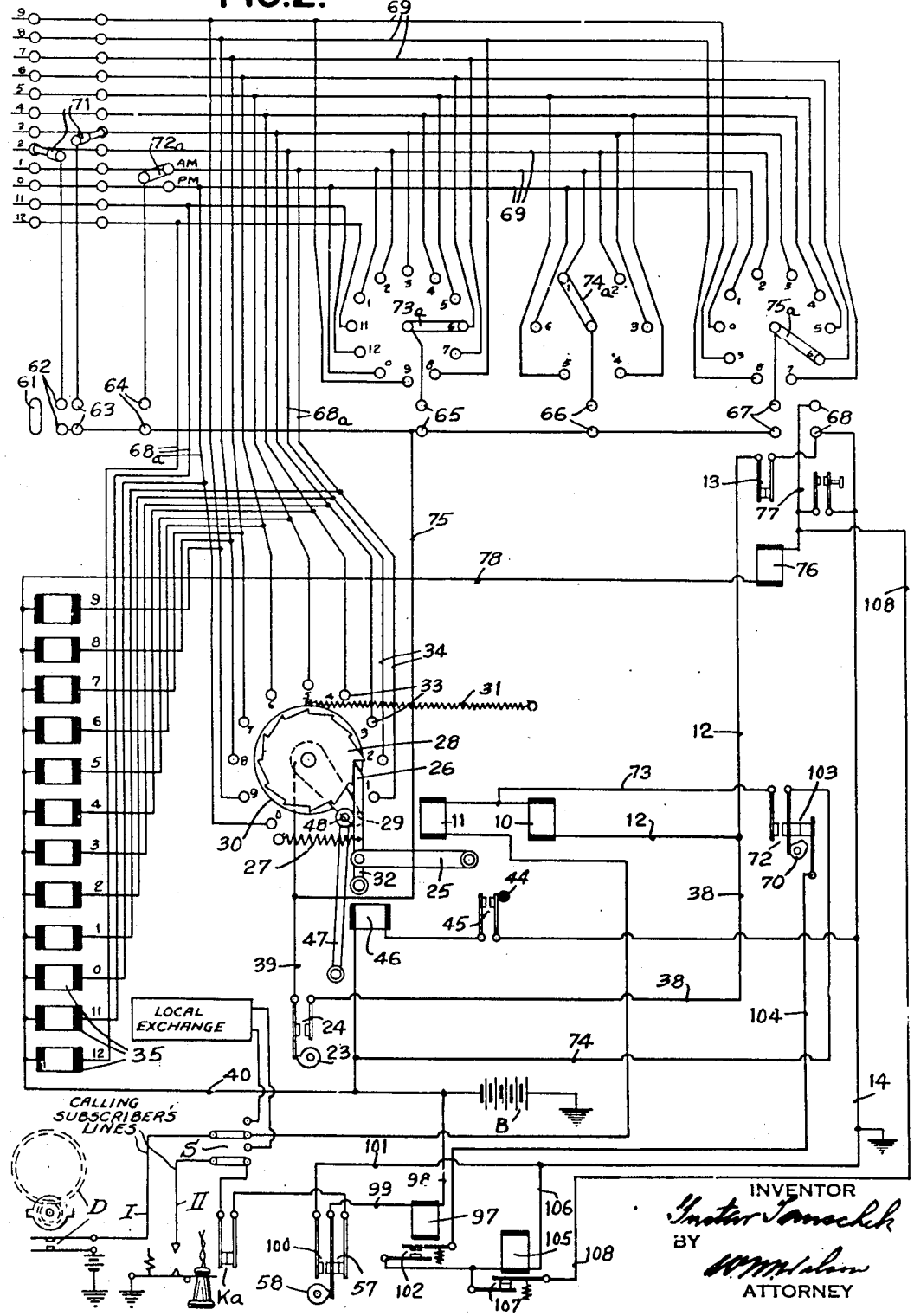

Oct. 12, 1937.   G. TAUSCHEK   2,095,298
TELEPHONE SYSTEM
Filed Oct. 30, 1935 .   5 Sheets-Sheet 3
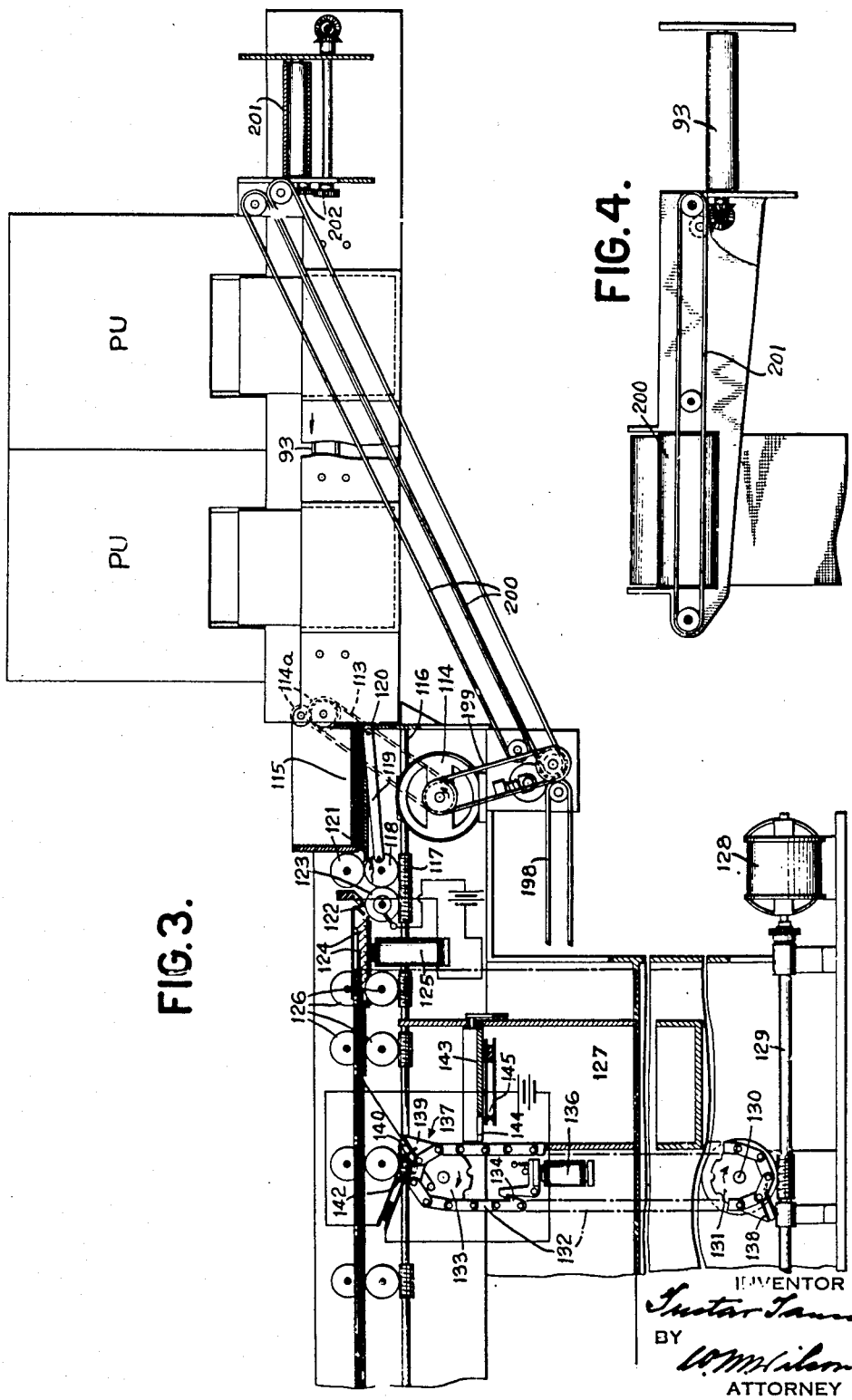

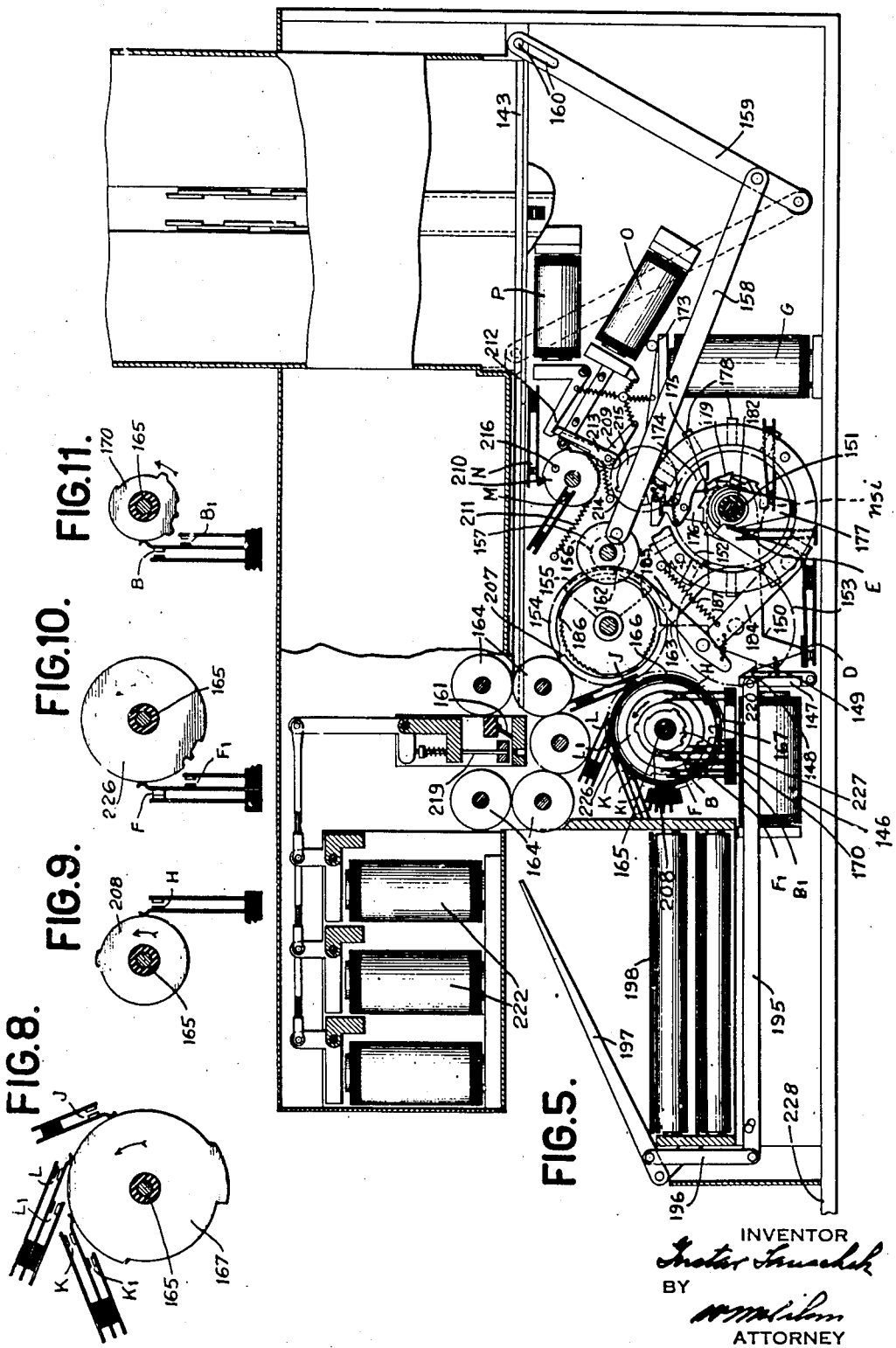

Patented Oct. 12, 1937

2,095,298

UNITED STATES PATENT OFFICE 2,095,298

TELEPHONE SYSTEM

Gustav Tauschek, New York, N. Y., assignor to International Business Machines Corporation, New York, N. Y., a corporation of New York Application October 30, 1935, Serial No. 47,350

19 Claims. (Cl. 179—7.1)

This invention relates to telephone systems and more particularly to that type controlled by punched cards.

The main object of the invention is to provide an apparatus by means of which the calling and called numbers are represented on a punched card so that the card can be utilized to effect the telephone connection. Other related data, such as the time of connection and disconnection are also designated on the same card providing a basis for a calculation of the elapsed time. By a supplemental punching machine the rate applicable for the call is also represented on the punched card whereby the elapsed time and the rate are the factors by which the product is calculated by a card controlled multiplying machine.

It is the present practice to write the desired data upon suitable memorandum sheets for subsequent use in billing purposes. The recording of the essential particulars by the present apparatus gives a true and unchangeable record since the recording of the desired data is performed in the form of a punched card.

A punching apparatus simple in construction and operation is shown herein as one embodiment and is under control of the dial of the calling subscriber to cause the punching of a card in accordance with the exchange number, the called and calling numbers, and the time the call was made. A plurality of punching units are preferably utilized and they can be selected by dialing certain call numbers.

A further object of the invention is to provide electrical interlocking means which prevents the selection of a punching device which is already in use by one subscriber.

A still further object is the provision of means which automatically rejects a card when an erroneous digit has been entered on the card. This error is observed by the calling subscriber and the rejection is effected by hanging up the receiver.

The punched card containing all the particulars essential for making the connection is then conveyed to the sorting machine which assorts the punched cards according to the exchange number or designation. The card is then fed automatically to the machine designated herein as a "connection performing machine."

It is a still further object of the invention to provide a suitable embodiment of such a machine which will automatically effect the telephone connection between the called and calling subscribers. It is a still further object of the invention to take care of certain exigencies which may arise in making the connection, such as one or another subscriber may not answer the call, or the lines of one may be busy to prevent such a call.

In the preferred embodiment of the machine which is adapted to make the telephone connection, the card is analyzed to determine first the called number and by transmitting electrical impulses representing the digits of the called number the automatic machine switching apparatus selects the lines of the called subscriber. In the event that this line is now busy the card is rejected, conveyed to the assorting apparatus and then the call is repeated.

The failure of the transmission of a busy signal of the called subscriber causes the selection of the lines of the calling subscriber. A still further provision of means in the connection performing machine rejects the card upon the transmission of a busy signal from the calling subscribers' lines and the call is then repeated.

A still further object of the invention is the provision of means for rejecting the card in the event that one subscriber may not respond to the call within a predetermined period.

The interconnection of the called and calling subscriber initiates the operation of recording apparatus for punching the time of connection and the termination of the communication causes the recording of the time of disconnection.

The present punching devices are adapted for reasons of simplicity to punch cards according to the well known Hollerith system for which card controlled multiplying machines and tabulating machines have been devised. The use of the present telephone system with such machine permits automatic billing and eliminates errors arising from the use of the system now in vogue.

The present system may be utilized for either long distance or local calls where a multiple of exchanges are provided. By a suitable re-arrangement within the spirit of the invention the machines may be utilized for making ordinary local calls which do not involve assorting of cards.

The accompanying drawings illustrate one construction of the invention, in which drawings:—

Fig. 2 is a wiring diagram of the electrical instrumentalities of the punching machine shown in Fig. 1.

Fig. 3 is a longitudinal sectional view of the card assorting machine which assorts the cards according to the exchanges and feeds them to the telephone connection devices.

Fig. 4 is a detail view showing part of the card conveyor system.

Fig. 5 is a cross-sectional view of the machine which is provided to analyze the called and calling numbers, make the connections, and punch the card to represent the time of connection and the time of disconnection.

Figs. 8–11 are detail views of certain contact controlling cams for the machine shown in Fig. 5.

As soon as the subscriber dials a number by a dial D shown diagrammatically in Fig. 2 in the usual manner by the line I (Fig. 2) there will be transmitted current impulses to a plurality of magnets 10 and 11. Current travels over the line wire I, through magnets 10 and 11, by wire 12 through contacts 13 now closed (see Fig. 1) and wire 14 grounded for the battery connection.

Lines I and II in Fig. 2 are impulse transmitting lines from the calling subscriber, and talking circuits from this subscriber are closed by means to be described later, in connection with Fig. 6. To make the illustration simple it is supposed that each subscriber has a related punching machine. By means of a switch S a punching machine now to be described is connected with lines I and II. After the called and calling numbers are both dialed, the switch S is restored so as to connect the lines I and II of the subscriber with the local exchange E. This switch diagrammatically takes the place of the usual machine switching which could be used to select one punching device provided for a number of subscribers and selected for use by dialing a certain number.

Figures 1, 7:
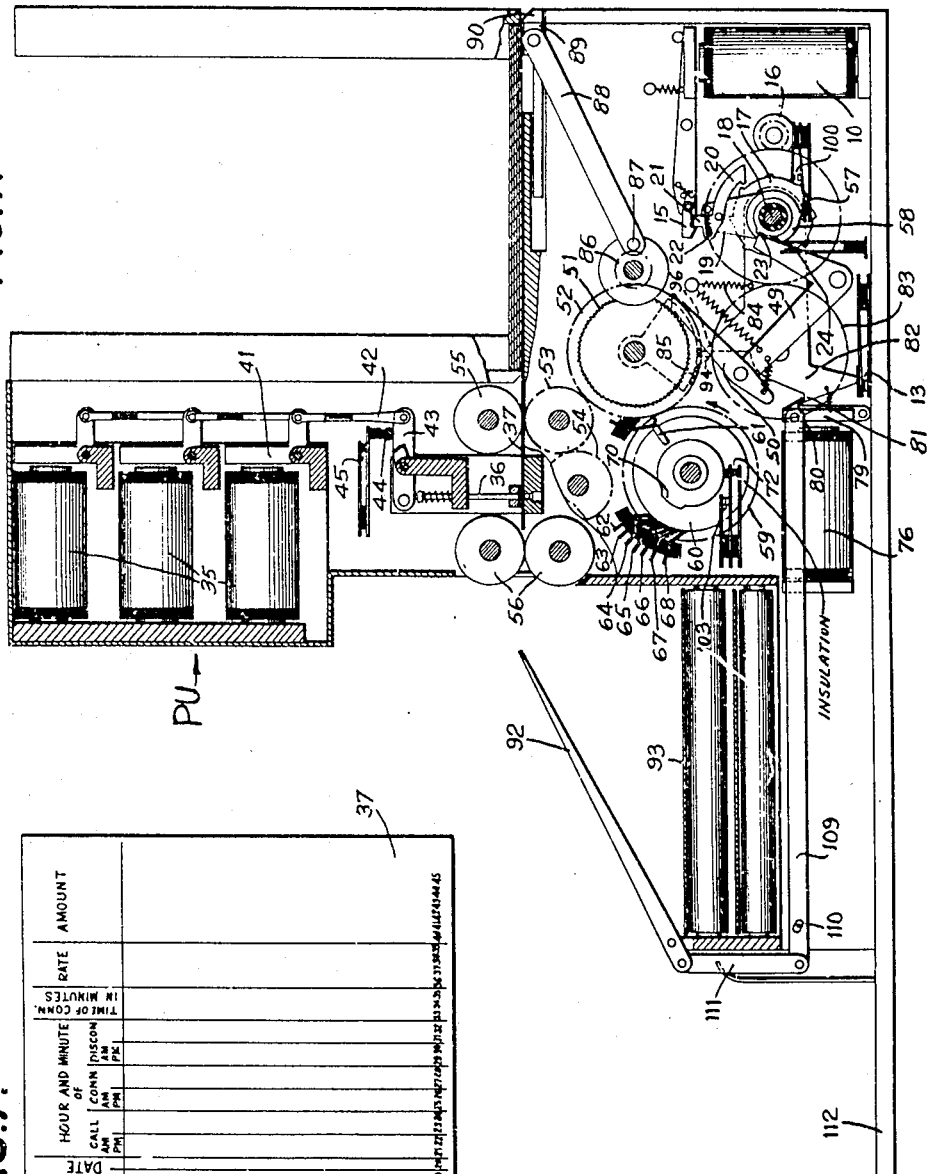
Fig. 1 is a cross-sectional view of the machine which is provided to punch the card to represent the calling and called subscribers' numbers, and other data, such as the date and the time of the day the call was made.
Fig. 7 is a representation of a card.

Magnet 10 is shown in Fig. 1 and when energized attracts and rocks its armature to elevate a pawl 15 carried at one end of the armature. A motor 16 is adapted to continuously rotate a ratchet wheel 17 in a clockwise direction. To a shaft 18 on which the ratchet wheel 17 is loosely mounted there is secured an arm 19 on which is pivoted a clutch pawl 20, said clutch pawl being normally free of connection with the ratchet wheel teeth by the engagement of its tail 21 with the end of the armature of magnet 10. Upon energization of magnet 10 this engagement is terminated so that clutch pawl 20 is free to be rocked by its spring 22 to engage a clutch tooth and thereby rotate arm 19 and shaft 18. Prior to the end of a complete revolution of shaft 18, magnet 10 now being deenergized as will be subsequently explained, the pawl 15 is permitted to take its normal position so that the tail 21 rides beneath the pawl and is latched by the hook of pawl 15 at the end of the armature. Since the clutch pawl 20 is now free of the ratchet wheel 17 it will permit the latter to rotate idly. In the above manner shaft 18 is given a complete revolution. The above described form of clutch device is well known and is used extensively in card controlled tabulating machines and the like and for this reason is briefly explained herein.

The speed of the motor is so selected that the subscriber's dial disk (even though the highest digit is dialed) will return to normal before a cam 23 can close contacts 24 which close the circuit to a selected punching controlling magnet, this timing relationship insuring the punching of the digit setup in the punching device.

As successive impulses corresponding to the digit dialed are transmitted to magnet 11 (Fig. 2) an armature 25 will be reciprocated. To the armature 25 there is pivoted a pawl 26 urged by a spring 27 to engage the teeth of a ratchet wheel 28 to which is connected a contact switch arm 29 and a wheel 30. To the wheel 30 there is attached a spring 31 which is extended as the ratchet wheel 28, arm 29 and wheel 30 are turned step-by-step. To hold the shifted position of the last-named parts there is provided a spring urged retrograde preventing pawl 32 (similar to pawl 26) also cooperating with the ratchet wheel 28. Obviously by the above described operating device switch arm 29 will be turned so as to contact with a contact point 33 corresponding to the digit dialed.

Each contact point 33 has a wire connection 34 to a related punch magnet 35. For punching digits, as is now being described, only ten are employed, the two extra magnets shown in Fig. 2 being employed for a purpose hereinafter described.

The data to be punched is represented on a conventional form of tabulating card 37 shown in Fig. 7. The vertical column of figures designates the positions by which the different digits are represented and the punches 36 (Fig. 1) operated by the energization of the punch magnets 35 are so spaced as to punch in these positions.

At the initial operation of the machine a card 37 is in the position shown in Fig. 1 ready to punch in column #1 the first digit of the called number.

When switch arm 29 (Fig. 2) is in the proper contacting position cam 23 closes contacts 24 closing the following circuit. Line wire 14 grounded to battery, contacts 13, wire 12, wire 38, contacts 24 now closed, wire 39 having a frictional electrical contact with the contact arm 29, the selected contact point 33, wire 34 to the selected punch magnet 35 and wire 40 to the other side of the grounded battery.

Observing Fig. 1 it will be noted that when a selected magnet 35 is energized its armature 41 is rocked to elevate a link 42 connected to a bell crank punch operating arm 43 thereby depressing the related punch 36 and forcing it through the card 37. After the punching operation a ball 44 overlying the series of arms 43 will cause contacts 45 to close. In Fig. 2 it will be seen that contacts 45 cause the closure of a circuit of a magnet 46 which attracts its armature 47. The latter carries a stud 48 engaging both pawls 26 and 32 to operate them so that spring 31 is now free to return the arm 29 to normal. Obviously at this time contacts 24 are open preventing improper punching operations as the arm 29 moves over the contacts 33.

After a column has been punched it is necessary to feed the card a step comprising the width of a vertical column preparatory to punching in the next card column. To this end cam 23 (Fig. 1) as it rotates each time rocks a bell crank 49 and draws downwardly a pawl 50 which is in co-operation with a ratchet wheel 51. To the latter there is secured a gear 52 adapted to drive a gear 53 and by means of the latter a gear 54. The card is fed by two sets of feeding rollers 55 and 56 driven by gears 53 and 54 respectively to thereby feed the card by the above described operating device in a step-by-step movement.

In the above manner the digits of the called number, comprising the exchange number in columns 2, 3 and 4 (Fig. 7) and the called number proper in columns 5-11, are punched in the card 37. Thereafter the calling subscriber dials his own number which is punched in columns 12-16 after which he hangs up his receiver.

To insure that the operation of the punching device in action will not be disturbed by another subscriber calling the same number the following precautionary devices are preferably employed. Contacts 57 (Fig. 1) are normally closed but are opened when a cam 58 rotatable with arm 19 rotates. From Fig. 2 it will be observed that line II through contacts $K_a$ will be opened by contacts 57 and such line cannot be selected for operation as long as the related punching device in in use.

It is also desirable that other data be punched on the card, as for example, the date and the time the call was instituted.

To this end gear 52 (Fig. 1) drives a gear 59 rotatable with a disk 60 of insulating material and which disk at its periphery carries a circuit connector 61. The latter is adapted to successively connect pairs of contact points 62—67 when columns 19—24 are in position for punching. Punch magnets 35 of the series of twelve have twelve wire connections 68a (Fig. 2) to the twelve lines 69 for a reason which will be later apparent.

By inserting plugs 71 in jacks of the desired lines 69 the punch magnets 35 which are adapted to cause the punching of holes at the "2" and "3" places will be selected for operation in columns 19 and 20 as connector 61 bridges contacts 62 and then contacts 63. Thus, the date "23" is designated on the card. These plug connections are changed day by day and the plugs 71 are inserted in the jacks which select the appropriate punch magnets.

The time of day of the call is designated by code, "0" for P. M. and "1" for A. M., the appropriate punches being pre-selected by a manually set switch arm 72a, or plug connection.

A conventional jump clock is adapted to set during the day three switch arms 73a, 74a and 75a. Such a jump clock may constitute one of the type shown in the patent to Thrasher No. 700,454, dated May 20, 1902, and the selector arms 73a, 74a and 75a may be connected to the time indicating wheels C, B, and A, respectively, shown in this patent. The position of the minute selector arm 75a shown will select one of the ten punch magnets 35 to punch —6—. The position of the tens of minute selector arm 74a shown will select one of six magnets to punch —1—. The position of the hour selector arm 73a shown will select one of the twelve magnets to punch —6—. For punching in these two extra positions, 11 and 12 on the card, the two extra punch magnets are used. In the position of the selector arms shown the time will be punched as —6.16—. The first arm 73a selects one of the twelve magnets 35 for causing the hour to be represented by the punching of a hole, the arm 74a the tens of minutes, and the arm 75a the units of minutes. The punches representing the time of the day are pre-selected by connector 61 as it closes contacts 65, 66 and 67. When the twenty-four columns have been punched a complete record of the call instituted has been made but prior to the employment of such card for making the call other operations are performed and will now be described.

At this time it should be noted that a punching operation for data for columns 19-24 is effected for each cycle of machine operation which is continued by keeping magnet 10 energized since it is not now energized by impulses from a line I. To the disk 60 then is secured a cam 70 (Fig. 1) which is adapted to keep contacts 72 closed during the punching for columns 19-24 thereby extending a wire connection 73 from magnet 10 (Fig. 2) to one side of the battery B by a wire 74. Thus magnet 10 is kept energized so that successive punching operations are continued. Each punching operation is instituted when contacts 24 close and such contacts are effective to electrically connect the selected punching magnet in the circuit of battery B when the time is punched because of the wire connection 75 therefrom to one of each of the pairs of contacts 62-67 inclusive.

When the connector 61 reaches the last contacts 68 (Fig. 2) the latter are bridged, thereby closing a circuit to a magnet 76 described as follows: grounded side of the battery, line wire 14, contacts 68 now closed, wire 77, magnet 76, wire 78, wire 40 to the battery B. Magnet 76 (Fig. 1) thereupon attracts its armature 79 disengaging a hook portion 80 from a shoulder 81 of a plate or frame 82. On this frame there is rotatably mounted a gear 83 continually driven by the motor 16. When the frame is unlatched a spring 84 causes gear 83 to mesh with the gear 52 so that a direct connection from the motor to the sets of feeding rollers 55 and 56 is provided. Thus the card is removed from the punching device at a high speed.

When this is being effected a segment gear 85 rotatable with gear 52 will engage and drive a gear 86. To the latter there is secured a disk having a crank pin connection 87 to a link 88.

Slidably mounted by any suitable means in the framework is a card picker 89 having a shoulder 90 of sufficient height to engage the edge of only one card 37 in the supply stack and obviously, the lowermost card. The link 88 is connected to the card picker so that upon a complete revolution of gear 86 the picker will feed the lowermost card and convey it to the feeding rollers 55 which are now rotating so as to position the succeeding card for punching in the first column.

The punched card, if completely punched is fed by rollers 56 and is deflected downwardly by a deflector arm 92 so as to fall upon a conveyor plate 93.

It should be observed that in this last cycle of operation a cam portion 94 of a cam rotatable with gear 52 engages an inclined edge 96 of frame 82 so as to rock the latter and cause it to be relatched by the hook 80 of armature 79, thus bringing the parts to normal.

Means is provided to reject the card if the calling subscriber finds that he has dialed a wrong number in columns 2-18. Cancellation of a call is effected by hanging up the receiver immediately after dialing a wrong digit.

Under such circumstances the ground connection is removed from line II in the usual manner. When the calling subscriber dials a number his receiver is off the hook so that the ground is connected to a magnet 97, the latter being connected at one side to the grounded battery B by a wire 98. During a punching operation contacts 100 close before contacts 57 open so that magnet 97 is connected in the battery circuit by wire 99, contacts 100 now closed and a wire 101 grounded by wire 14. Before contacts 100 open contacts 57 close and if the receiver is still off the hook line II is grounded through closed contacts K₁. In the event that the receiver is replaced on the hook contacts 100 open at the end of a digit punching operation. Contacts 57 close but with line II ungrounded relay magnet 97 is now de-energized and this permits its contacts 102 to close. This causes a relay magnet 105 to be energized by the follow-circuit. Battery B, wire 74, cam controlled contacts 103 now closed, wire 104, contacts 102 now closed, relay magnet 105, to the ground. Contacts 107 are normally closed so that by a wire 108 an impulse is sent to the magnet 76. Relay 105 is a delayed time relay so that contacts 107 remain closed a short time before they are opened by the energization of relay magnet 105 so that only a short electrical impulse is transmitted to magnet 76.

Referring to Fig. 1 when the armature 79 of magnet 76 is attracted it shifts a link 109 to the left and by an inclined cam slot and pin connection 110 it elevates a pitman 111 thus rocking the deflector plate 92 clockwise. The incompletely punched card has emerged from the rollers 56 a sufficient extent in this case so that upon further feeding of the card the deflector plate 92 will cause such card to be guided to drop on a plate 112, its presence thereon indicating an undesired card. Thus, by the provision of the above described device only those cards that have been completely and properly punched are transmitted to the conveyor belt 93 and these are adapted to effect the telephone connections in a manner to be described.

Attention is directed to the fact that when card columns 19-24 are being punched cam 70 (Fig. 1) will retain contacts 103 (Fig. 1) open so that if the receiver is then hung up magnet 76 will not be energized until columns 19-24 are punched. As previously stated the punching of columns 19-24 is effected by connector 61 engaging contacts 68.

It should also be noted that during the punching of columns 2-24 contacts 13 (Fig. 1) are closed. As will be observed in Fig. 2 whenever magnet 76 is energized, before the call is completely punched or at the completion of proper punching operations, contacts 13 open. This opens the circuit to the punch selecting magnets 35 to prevent operation of the punching device when the card is ejected at high speed by means of the gear 83.

Fig. 3 shows two of the punching units PU one of which is shown in detail in Fig. 1 and also shows the conveyor belt 93 disposed in the front of two of such units. Obviously more punching units can be provided and all can dispose their properly punched cards on the conveyor belt 93. The left loop of the conveyor belt 93 passes around a roller which is driven by a belt connection 113 to a motor 114. Belt connection 113 also drives feeding rollers 114a which feed the completely punched cards to a magazine 115.

Motor 114 drives a spindle 116 and by a worm 117 a disk 118 is turned. A link 119 eccentrically mounted on disk 118 connects the disk 118 with a card picker 120. Thus cards by conventional mechanism are fed singly from the magazine 115 to feed rollers 121 which are also driven by the spindle 116. The punched cards pass between an analyzing brush 122 and a contact roll 123 and also beneath sorting blades 124 of a sorting mechanism of a type well known in the art and fully described in the patents to Ford No. 1,657,654 dated January 31, 1928 and No. 1,741,985, dated December 31, 1929. To understand the present invention it is sufficient to know that a circuit for a sorting magnet 125 is closed when analyzing brush 122 encounters a card perforation. Analyzing brush 122 is adapted to analyze the perforation in column #2 denoting the exchange station. When there is encountered a perforation in the "1" position, for example, the leading edge of the card which is supported by plates (not shown) is between the upturned blade ends of the two lowermost blades. Thereupon magnet 125 is energized and the bottom blade drops downwardly while the card is held supported, all in the manner described in the aforesaid patents. The card is now fed by rollers 126 which are driven by the spindle 116 between the two blades and is guided by an inclined portion integral with the top blade to be fed to the "1" pocket, which is the one marked 127 in Fig. 3.

Each sorting pocket has operatively associated therewith a plurality of "connection performing devices" to be described hereinafter.

Numeral 128 designates a motor which drives a shaft 129 which is adapted to drive a shaft 130 by a suitable friction drive comprising two frictionally contacting disks of a well known construction. To the shaft 130 there is attached a scalloped disk 131 around which passes a link belt 132 to be driven thereby. Link belt 132 is of a length suitable to extend to all the several connection performing devices of one exchange.

The upper end of the link belt passes around a scalloped disk 133. A projection 134 of one link normally engages a bell crank arm which is the armature of a magnet 136. This is the normal relationship so as to prevent movement of the link belt 132 by the friction drive.

The belt 132 carries two grippers 137 and 138. The triangular-shaped element 139 of a gripper is attached to two link pivots while the other element 140 is spring-urged and pivoted on another link pivot.

When the card is fed to the pocket 127 the card is fed by rollers beneath the inclined part of the sorting blade leading to the pocket and between the gripper fingers 139 and 140 of the gripper in position and closes contacts 142, thus closing a circuit to magnet 136 to free the link belt 132 for movement. The card now gripped by gripper 137 passes down the channel until it rests upon a track plate 143, the element 140 rocking about its pivot free of the card so that the latter remains on track plate 143. The triangular part 139 passes through a cut-away part 144 of the track plate 143 and closes contacts 145.

Summarizing, a card is sorted according to the exchange number and fed to a track plate 143 leading to the connection performing device shown in Fig. 5 in detail and now to be described.

When contacts 145 close a circuit through contacts D, now closed (see Fig. 6), will be closed to a magnet 146 (Fig. 5) which being energized by battery Ba thereupon draws the upper end of its armature 147 to the left disengaging a hook 148 thereof from a shoulder 149 of a plate 150 loosely pivoted upon a shaft 151. On shaft 151 there is mounted a gear 152 constantly driven by and in mesh with a gear 153 pivoted on the plate 150. When plate 150 is unlatched a suitable spring rocks it to cause the gear 153 to mesh with a gear 154. To the gear 154 there is attached a segment 155 in mesh with a gear 156 secured to a disk 157. The left end of a link 158 is eccentrically mounted on the disk 157 and the right end is pivoted to an arm 159 which has a pin and slot connection 160 to the aforesaid track plate 143 which at this time carries a punched card. By the driving mechanism thus described the plate with the card is fed to the left between feeding rollers 164 and beneath an analyzing brush 161 which analyzes the fifth column representing the highest denominational order of the called number. It should be noted that in the sorting mechanism the card is fed in the direction of its vertical card column while in the device now being described the direction is at right angles or the direction in which the card is analyzed column by column. Obviously there is one brush 161 (see Fig. 6) for each of the ten possible perforations in a card column so that it can be determined which index point position is perforated.

When the card arrives with its fifth column in operative relationship with respect to the brushes 161 a cam projection 162 of an element rotatable with gear 154 engages a projection 163 of the plate 150 depressing the same so as to free the gears 154 and 153 from a meshing relationship. Card feed by this mechanism thereupon stops and plate 150 is now relatched by the armature 147.

It should be noted that gear 154 drives by suitable gearing the two sets of feeding rollers 164 which feed the card to and away from the brushes 161.

Driven by gear 154 is a commutator and a series of cams, all secured to a shaft 165 which carries a gear 166 which is in mesh with the gear 154. Obviously at the initial analyzing position of the card, which is card column #5, shaft 165 has been given a partial rotation. At the end of this partial rotation of the shaft 165 a cam 167 is adapted to cause the closure of contacts L and by means of such contacts a set of contacts nsi (Fig. 6) are connected by a wire 168 to the line 169 going to the outgoing exchange of the called subscriber.

At the same time a cam 170 (Fig. 5) is adapted to close contacts B1. It should also be noted that since plate 150 is now latched contacts D are closed by the plate 150 thus extending a circuit connection from the grounded side of magnet G (Fig. 6), wire 171, through closed contacts B1, wire 172, closed contacts D to the battery Ba and ground connection thereof.

When magnet G is energized it attracts its armature 173 (Fig. 5) thereby releasing a pawl 174 for engagement with a ratchet wheel 175. The ratchet wheel is constantly rotating as it is driven by a suitable motor which also drives the gear 152. Pawl 174 is carried by an arm 176 attached to the shaft 151. In the manner previously explained the shaft 151 by the clutch just described is given one or more cycles of operation and as long as the circuit to magnet G is closed by contacts B1 and D. Attached to the shaft 151 is an arm 177 adapted in one revolution of shaft 151 to contact with a series of ten contact points 178 which as shown in Fig. 6 are wired to the analyzing brushes 161. Also secured to shaft 151 is an interrupter wheel 179 adapted to cause the opening and closing of contacts nsi ten times in one revolution of the shaft 151.

Figure 6:
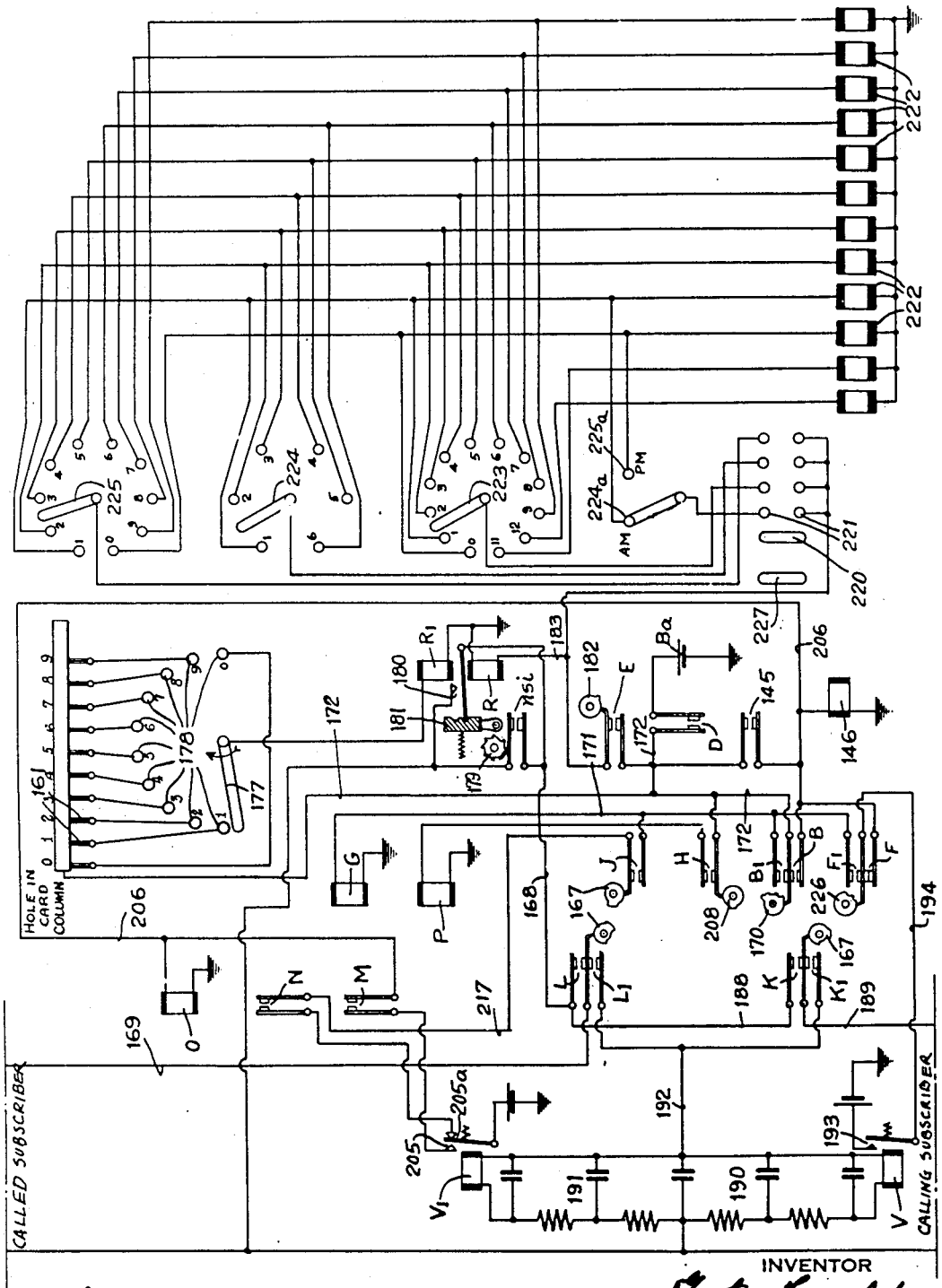
Fig. 6 is a wiring diagram of the electrical instrumentalities of the machine shown in Fig. 5, and illustrates the electrical connections to the subscribers' telephone line selectors.

Referring to Fig. 6 each time that contacts nsi are opened and closed the line 169 to the selector of the called subscriber will be interrupted precisely in the same manner as if the number was dialed. After each interruption of contacts nsi the arm 177 is moved a step. In the event that it engages a contact point 178 leading to the brush 161 which encounters a perforation contacts nsi are shunted so as to prevent further interruptions to the line 169. When arm 177 engages the contact point 178 numbered "4", assuming that the column has a perforation at the "4" position, a circuit will be made described as follows: from the battery Ba, contacts D now closed, wire 172, brush 161, through the card perforation to the related contact point 178, arm 177, relay R1, (energizing the same), to the ground. Thereupon contacts 180 close to shunt contacts nsi and are held closed by suitable mechanical flexible holding means 181.

At the termination of the revolution of shaft 151 a cam 182 secured thereto closes contacts E (Fig. 5) thereby closing the circuit 183 to the relay R. The latter causes contacts 180 to open and thereby the line selector interrupting mechanism is again in condition to cause circuit interruptions in accordance with column 6 or the next digit of the called number.

As each digit is read from the card the latter is stepped column by column. To this end cam 182 causes one arm of a bell crank 184 to be shifted to force a pawl 185 downwardly. The latter is spring-urged to engage teeth of a ratchet wheel 186 rotatable with the gear 154. The latter by feeding rollers 164 feeds the card in increments and a step after each card analyzing operation. A spring 187 retracts the pawl 185 and bell crank 184 to normal after the card feeding operation has been performed.

Thus impulses are transmitted to the line 169 going to the outgoing exchange to select the called subscriber and the calling impulses terminate after card column #11 has been analyzed. Thereafter, card columns 12–18 are analyzed to call the calling subscriber in a manner now to be explained. Shaft 165 obviously rotates step-by-step keeping contacts L and B1 closed by their respective controlling cams. When the card is in the position to analyze the card column #12 cam 167 causes contacts K to close and contacts L thereupon open. Now, impulses transmitted under control of the perforation in columns 12–18 are directed from contacts nsi by a wire 188 through contacts K to the line 189 going to the exchange to the calling subscriber. At the same time contacts L—1 are closed by cam 167 and two filter chains 190 and 191 are switched by contacts L—1 to the line selector of the called subscriber, the circuit extending from line 169, through contacts L—1 and by a wire 192 to the filter chains.

In the filter chain 190 which is now connected to the line 169 of the called subscriber through contacts L—1 there is provided a relay magnet V and the relay magnet is so selected that it will receive a current impulse when the line 169 of the called subscriber transmits a busy signal. Thereupon relay contacts 193 of relay magnet V close. A circuit will then be closed from magnet 146 grounded at one side, contacts F (now closed), wire 194, contacts 193, and a grounded battery in this local circuit.

It will be recalled that when magnet 146 is energized frame 150 (Fig. 5) is unlatched and contacts D (Fig. 6) open to cause clutch control magnet G to be deenergized, and to open the circuits controlled by contacts nsi. However gear 152 (Fig. 5) is constantly rotating and through gears 153 and 154 the feeding rollers 164 will be rotated. It should be noted that when armature 147 is attracted by the magnet 146 a link 195 will be moved to the left to depress a pitman 196 and rock a deflector arm 197 so that the card emerging from rollers 164 will be deflected downwardly upon a belt conveyor 198.

It will be recalled that feed rollers 164 feed the card in a direction along its horizontal length so that after being placed on the belt conveyor 198 it is now moved along its vertical direction. Belt conveyor 198 is shown in Fig. 3 where it will be seen that it is driven by the motor 114 by a belt connection 199. The latter also drives a pair of conveyor belts 200 which grip the card received from belt conveyor 198 between their contacting surfaces and eject it at their right loops (Fig. 3) to be placed on a conveyor belt 201 (see Fig. 4) also driven by suitable gearing 202 connected to the feed rollers of the belt conveyor 200.

The belt conveyor 201 feeds the card and drops it upon the belt conveyor 93. The belt conveyor arrangement disclosed in Figs. 3 and 4 not only feeds the card but shifts the direction of its feeding movement so that ultimately it is fed in a direction along its vertical length. The card is again sorted and fed to a connection performing device so that the call is repeated after a short time.

Assuming that no busy signal from the called subscriber is received card columns 12–18 are now analyzed and in the manner previously described the line 189 of the calling subscriber is interrupted since contacts nsi are now connected thereto by contacts K, wire 188 and contacts L. When column 18 has been analyzed contacts K—1 are closed by cam 167 and the line 189 of the calling subscriber is connected to the filter chains 190 and 191. If the calling subscriber is now busy the busy signal will be transmitted and in the manner previously described relay magnet V will cause magnet 146 to be energized so that the card will be ejected from the connection performing machine and the call repeated, all in the manner previously described.

When a busy signal is not received for either, the calling or called subscriber lines 189 and 169 are interconnected by contacts L—1 and K—1 closed at the same time by cam 167 so that the calling and called subscribers can talk with each other. After impulses are transmitted to the line 169 or line 189 a ringing signal is transmitted in the usual manner to call the party. When a party called lifts his receiver, a busy signal will be transmitted over his line, in the usual manner, in the event that the other party's line is busy. The filter chain 191 allows the alternating current of this ringing signal to energize a relay V1 to cause its contacts 205 to be connected in series with contacts M in a circuit which includes a local grounded battery.

In the event that neither line is busy but one subscriber may not answer the call within a short time, say 30 seconds, the card is rejected, fed to the conveyor system and the call repeated after a short time.

When the 18th card column has been analyzed cam 170 opens contacts B1 and closes contacts B, (see Fig. 6). A circuit will now be made from battery Ba, contacts D now closed, wire 172, contacts B now closed, to magnet 146. There is also a line wire connection 206 from contacts B to a magnet O to cause the latter to be energized.

As previously stated magnet 146 causes plate 150 to be unlatched to cause the feeding rollers 164 to rotate and they will rotate until a cam portion 207 (Fig. 5) of a rotatable element engages the cam portion 163 and separates the driving gears 153 and 154 and causing the feeding rollers to be stopped. Before this time a cam 208 closes contacts H to cause a magnet P to be energized through contacts D since plate 150 is now re-latched which was effected by the action of the cam portion 207 on the plate 150.

Referring to Fig. 5 reference numeral 209 designates a spring-pressed holding pawl having an operating projection engageable with ratchet teeth of a notched disk 210. When magnet O is initially energized by contacts B its armature will rock the pawl 209 so that its operating projection is disengaged from the disk 210. The latter has a return spring 211 connected thereto so that the initial energization of magnet O will insure the normal position of disk 210 before it is rotated step-by-step in a manner now to be described.

When magnet P is energized the hook 212 of its armature is released from an operating pawl 213 for the disk 210. The pawl 213 is thereupon rocked by its spring so that its operating projection engages the ratchet teeth of the disk 210. The gear 152 drives a pinion 214 and the latter has rotatable therewith a cam 215 adapted to reciprocate the pawl 213. By cam 215 the disk 210 is turned step-by-step so that upon the initial rotation of disk 210 its cam portion will close contacts N. Relay magnet V1 (Fig. 6) is now energized. Contacts 205a are now open so that the closure of contacts N have no effect at this time. Later on a pin 216 carried by disk 210 (Fig. 5) will close contacts M. Since contacts 205a are now closed contacts M will transmit a current impulse to magnet O and by the wire 206 to the magnet 146. Magnet O will disconnect the holding pawl 209 from disk 210 so that the latter can be returned to normal by spring 211 and cause the pawl 213 to be re-latched by the hook 212. Since magnet 146 is now energized the feeding rollers 164 will eject the card from the machine and deposit it upon the belt conveyor 198. This operation takes place about 30 seconds after the ringing signal is transmitted giving both parties that length of time to answer a call. If one does not answer, the call is repeated after a short time.

There will now be described what happens when both subscribers remove their receivers within the predetermined length of time.

When the ringing signal stops due to the removal of the receivers of both subscribers from the hooks the armature of relay magnet V1 will be in the position shown in Fig. 6 and by means previously described contacts N will be closed. From contacts N there is a wire connection 217 to contacts J. The latter, as shown in Figs. 5 and 8 are now closed by the cam 167.

From contacts J (Fig. 6) there is the wire connection 171 to the magnet G, (see Fig. 5). Magnet G, as previously stated, will upon its energization, effect the operation of the clutch to cause shaft 151 to rotate. Upon the previous energization of magnet 146, caused when the 18th column was analyzed, the feeding rollers 164 were operated and these feed the card with its twenty-fifth column beneath the analyzing brushes 161. Upon the first revolution of shaft 151 the bell crank 184 will cause the feed rollers 164 to be operated a step to bring the 25th column beneath a set of punches 219.

At this time a circuit connector 220 of the commutator rotatable with shaft 165 is adapted to close a pair of contacts 221 (see Fig. 6) thereby selecting the appropriate punch control magnet 222 depending upon the position of a switch arm with respect to the "A. M." contact point 224a or the "P. M." contact point 225a. The punches 219 are selected for operation by the punch magnets 222 in the manner previously described. Column #25 will be punched to represent the time of day of the connection of the subscribers. The card is now fed a distance of three columns in a step-by-step manner so that connector 220 will cause the punching of the time of connection under control of a jump clock, 223 designating the hour selector, 224 the tens of minute selector and 225 the minute selector. One type of such a jump clock is shown in the patent to Thrasher No. 700,454, dated May 20, 1902. The selector arms 223, 224 and 225 herein shown may be connected to the time indicating wheels C, B, and A, respectively, of those shown in the patent and by the various positions of the time indicating wheels the selector arms 223, 224, and 225 will select the appropriate punch magnets 222 so that a card will be punched with hole designations in columns 26–28 indicating the time of connection of the calling and called subscribers. This particular arrangement is similar to that given for the description of the punching machine disclosed in Fig. 1. The circuit for the selected punch control magnet is closed by contacts E closed by the cam 182 rotatable with the shaft 151.

When the connecting time has been completely punched contacts B₁ open and the clutch magnet G is now de-energized. Shaft 151 now stops turning and during its rest period the subscribers talk with each other and the jump time clock which may be of the type shown in Patent No. 700,454 keeps on going during the inter-communication and sets the selector arms 223, 224, 225.

When the communication is finished the receivers are replaced on the hooks and the first one to do this causes a busy signal to be transmitted to energize the relay V and close its contacts 193. A cam 226 controlling contacts F and F₁ will now close contacts F₁ and open contacts F. Contacts F₁ are in series with contacts 193 and by the closure of both, current from a local battery circuit will be transmitted to magnet G. Shaft 151 will now be turned so as to cause the punching of the time of the disconnection between the subscribers' lines 169 and 189. In this instance a supplemental line connector 227 on the commutator will cause the selection of the punch magnets 222. The punching device operates in precisely the same manner previously described and punches the time of disconnection in card columns 29–32.

When punching in column #32 has been completed contacts B are closed by cam 170 to cause the energization of magnet 146. The latter will now cause the feeding rollers 164 to operate. While magnet 146 will cause the deflector arm 197 to be moved upwardly it will have no effect upon the intended disposition of the card. The latter has been fed so far that it is now over the deflector arm 197 and as it emerges from the rollers 164 it will be guided to fall into a box 228.

During the remainder of the rotation of gear 154 the segment 155 will restore the track plate 143 to its normal position ready to receive a succeeding card.

The elapsed time between the time of connection and the time of disconnection is figured out and by a punching machine of a well known form the same is punched in columns 33–35 and the rate is punched in columns 36–39. By means of a card-controlled multiplying machine the two factors, elapsed time and rate, are multiplied and the product is punched by this machine in columns 40–45. By means of a tabulating machine telephone bills for the various subscribers may be made automatically under control of the punched cards.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A telephone system including incoming calling lines and outgoing called lines, a telephone connection performing machine, in combination therewith, a perforating mechanism controlled by electrical impulses transmitted for perforating a card to represent an exchange designation and the called and calling number, means for analyzing the perforations representing the exchange designation, and means controlled thereby for assorting the card according to the exchange number for conveying said card to a related connection performing machine, means in said connection performing machine to automatically analyze the card to determine the called and calling number, means in said connection performing machine for interconnecting the incoming and outgoing lines, and means effective at the time of connection and disconnection of said lines for punching the same card to represent the time of connection and the time of disconnection of the incoming and outgong lines.

2. A telephone system comprising calling subscribers' lines and called subscribers' lines, means for punching a card to represent the numbers of the called and calling subscribers, means under control of the punched card to interconnect both of said lines, and means effective in response to a busy signal received from either of said lines for preventing the connection and for causing said card to be used again to control the interconnecting means.

3. A telephone system comprising calling subscribers' lines and called subscribers' lines, means for punching a card to represent the called number and the calling number, means under control of the card to interconnect both of said lines, means effective in response to a busy signal from either of said lines for preventing the interconnection and for causing said card to subsequently control the interconnecting means, and means effective when either subscriber fails to respond to the ringing signal transmitted over said lines for preventing the interconnection and for causing said card to be used again to control said interconnecting means.

4. In a telephone system, called subscribers' lines and calling subscribers' lines, means for punching a card to represent the numbers of both of said lines, means under control of said card for interconnecting both of said lines, means for preventing the interconnection when either subscribers' lines are in use or when either subscriber fails to respond to the ringing signal transmitted to both of said lines, and means for punching the same card to represent the time of interconnection and the time of disconnection of said lines.

5. In a telephone system, called subscribers' lines and calling subscribers' lines, a punching means including time indicating means for punching the time of interconnection between both of said lines and the time of disconnection, electrical means responsive to the transmission of a busy signal from either of said lines to prevent the operation of said punching means, and electrical means responsive to a ringing signal transmitted over both of said lines for preventing the operation of said punching means when either subscriber fails to answer the call within a predetermined period.

6. In a telephone system, the combination of lines over which digit representing electrical impulses are transmitted, a card punching mechanism including punches and a repeatedly operated prime mover, means for initiating the operation of the prime mover by the first electrical impulse transmitted and for causing repeated operations thereof, a series of punch control magnets, a selector switch adapted to take a position in accordance with the number of electrical impulses transmitted for selecting a punch control magnet, electrical means operated by each operation of the prime mover for causing the energization of each selected punch control magnet, means operated by the prime mover for establishing a change in columnar relationship between said punches and the card after each punching operation, and means for terminating the operation of the prime mover when the last digit has been punched on the card.

7. In a telephone system the combination with a punching machine including card punching mechanism, incoming lines of the calling subscriber, means for causing digit representing electrical impulses to operate the punching mechanism to punch a card to represent the digits, means for automatically conveying the punched card from said punching machine to a connection performing machine, the latter including means to receive the punched card, means arranged in the connection performing machine and under control of the card to interconnect the lines of the calling subscriber with the lines of a called subscriber, and means for ejecting the card from the connection performing means and for causing the punched card to subsequently control the interconnecting means when either of said lines are busy or when either subscriber fails to respond to a ringing signal transmitted over said lines.

8. In a telephone system of the class described, the combination with the telephone lines of a calling subscriber, of telephone lines of a called subscriber, means under control of the lines of the calling subscriber to punch a card to represent the number of the calling subscriber and the number of the called subscriber, punched card analyzing means, means automatically effective only when the calling subscriber restores his receiver after the card is punched to represent both numbers for conveying said card to said analyzing means, means under control of said analyzing means for automatically interconnecting the lines of both subscribers, means initiated in response to the interconnection for causing the punching of said card to represent the time of the interconnection, the last named means being initiated in response to one of said subscribers restoring his receiver to cause the punching of the time of disconnection of said lines, means for preventing the interconnection when either subscribers' lines is busy, and means for preventing the time of connection from being punched if neither subscriber responds to a ringing signal within a predetermined period.

9. In a telephone system, incoming lines of a calling subscriber and outgoing lines of a called subscriber, means for punching a card to represent the numbers of both lines, control means under control of the punched card to interconnect both of said lines, means for automatically conveying the card from said punching means to said interconnecting control means, means for repeatedly conveying said card to the inter-connecting control means when one subscriber fails to respond to a ringing signal, and means for effecting a selective disposition of the card when the subscribers effect the communication.

10. In a telephone system, the combination with calling subscribers' telephone lines, of called subscribers' telephone lines, a punching machine, an operating means therefor, means for causing the first digit representing impulse transmitted by impulse transmitting lines to said punching machine to initiate the operation of the operating means of said punching machine, punching means in said punching machine and including said operating means for punching under control of said impulses holes in the card representing a called number and calling number and thereafter ejecting by said operating means the card out of said punching machine, a structurally separate connection performing machine, means for conveying the ejected card to said connection performing machine, means for causing the presence of a card in said connection performing machine to effect the operation of said machine, means in said connection performing machine to analyze the punched card holes and means controlled thereby to effect the interconnection of the called and calling subscribers' telephone lines, and means effective at the time of connection and disconnection of the called and calling subscribers' lines to effect the punching of the card to represent the time of connection and disconnection.

11. In a telephone system the combination with calling subscribers' lines, of a punching means responsive to digit representing electrical impulses transmitted over said lines for punching a card to represent a called number and a calling number, means for feeding said card step-by-step as the card columns are punched, and means responsive to the calling subscriber restoring the receiver on the hook prior to the punching of the card to represent both numbers for disposing said card to a reject position.

12. In a telephone system, the combination with calling subscribers' lines, of a card punching means responsive to digit representing electrical impulses transmitted over said lines representing digits of a called number and calling number, feeding means for the card, means for causing said feeding means to feed the card a step when each digit is represented thereon by a punching operation, means responsive to the subscriber restoring the receiver on the hook of the calling telephone after or before both numbers are punched for causing said feeding means to feed the card by a continuous operation, and means for sorting the cards in accordance with an exchange designation and when the card is completely punched to represent both numbers.

13. In a telephone system, in combination, impulse transmitting lines of a calling subscriber, punching means responsive to digit representing electrical impulses transmitted over the lines for causing a card to be punched to represent a calling number and a called number, and an exchange number, means responsive to a subscriber terminating the impulse transmission prior to completely punching a card to represent both numbers for selectively ejecting the incompletely punched card out of said punching means, means effective when the card is completely punched to represent both numbers to feed said card from said punching means, a movable conveyor belt for thereafter receiving said completely punched card, an assorting mechanism including means to analyze the exchange number punched for assorting the punched cards according to the exchange number, and means for moving said conveyor belt to automatically convey the completely punched cards to said assorting mechanism.

14. In a telephone system, the combination with telephone lines of a calling subscriber and a called subscriber, of a punching machine including card punching means responsive to digit representing electrical impulses transmitted over lines from a calling subscriber, a structurally separate assorting machine with means for assorting cards according to an exchange number represented on said card, conveying means for automatically conveying a card from said punching means to said assorting machine, a connection performing machine including means for interconnecting the telephone lines of the called and calling subscriber under control of the punched card and means for punching the card to represent the time of connection and disconnection, and means for automatically conveying punched cards from said assorting machine to the telephone connecting means.

15. In a telephone system, the combination with impulse transmitting lines of a calling subscriber, of punching means responsive to digit representing electrical impulses transmitted over the lines to punch a card to represent a called number and a calling number, a power drive for said punching means for causing the operation of the latter, a card feeding means operated by the power drive for feeding the card step-by-step coincident with punching operations, means for initiating the operation of the power drive by the first electrical impulse transmitted over said lines and for causing the operation of the punching means by successive digit impulses and said card feeding means, time indicating means, and means effective when the card is punched by said punching means to represent a called and calling number to cause the operation of the punching means under control of the time indicating means and the operation of the card feeding means whereby the card is punched in a plurality of columns to represent the time the call is made.

16. In a telephone system, the combination with telephone lines of a called and calling subscriber, of means responsive to digit representing impulses transmitted over lines from the calling subscribers for punching a card to represent a called number and a calling number and effective when the receiver of the calling subscriber is off the hook, means for analyzing the punched card, means under control of said analyzing means for automatically interconnecting both of said lines, means for punching the same card to represent the time of connection and disconnection, means responsive to the restoring of the receiver on the hook when the card is partly punched with either the called number or calling number for preventing the operation of the inter-connecting means, and means for causing the card to repeatedly control the inter-connecting means when either lines are busy or when either subscriber fails to respond to a ringing signal within a predetermined period.

17. In a telephone system, in combination, a punched card representing a calling number and a called number, telephones lines of the called number and calling number, means for analyzing the punched card and means to interconnect both telephone lines, and means responsive to the failure to either subscriber to respond to a ringing signal transmitted over the lines within a predetermined period for preventing the interconnection of both telephone lines.

18. In a telephone system, means for analyzing a punched card for representations of a called number and a calling number, telephone lines corresponding to both of said numbers, means under control of the analyzing means to transmit electrical impulses over both lines, electrical means responsive to a ringing signal transmitted over the lines, and means whereby said electrical means prevents electrical impulses from being transmitted to one of said lines if a subscriber does not respond to the ringing signal transmitted over the other of said lines.

19. In a telephone system, means for analyzing a punched card for representations of a called number and a calling number, pairs of telephone lines corresponding to both of said numbers, means under control of said analyzing means for transmitting impulses over both lines, electrical means responsive to a busy signal received over the telephone lines which are busy, and means whereby said electrical means prevents said analyzing means from causing impulses to be transmitted over one pair of telephone lines when the other pair of telephone lines is busy.

GUSTAV TAUSCHEK.